United States Patent
Do et al.

(10) Patent No.: US 10,863,130 B2
(45) Date of Patent: Dec. 8, 2020

(54) BACKSIDE ILLUMINATED GLOBAL SHUTTER IMAGING ARRAY

(71) Applicant: BAE Systems Imaging Solutions Inc., San Jose, CA (US)

(72) Inventors: Hung T. Do, San Jose, CA (US); Chenguang Gong, San Jose, CA (US); Alberto M. Magnani, Danville, CA (US)

(73) Assignee: BAE Systems Imaging Solutions Inc., San Jose, CA (US)

( * ) Notice: Subject to any disclaimer, the term of this patent is extended or adjusted under 35 U.S.C. 154(b) by 0 days.

(21) Appl. No.: 16/476,911

(22) PCT Filed: Jan. 25, 2017

(86) PCT No.: PCT/US2017/014983
§ 371 (c)(1),
(2) Date: Jul. 10, 2019

(87) PCT Pub. No.: WO2018/140015
PCT Pub. Date: Aug. 2, 2018

(65) Prior Publication Data
US 2019/0335130 A1     Oct. 31, 2019

(51) Int. Cl.
*H04N 5/3745* (2011.01)
*H04N 5/353* (2011.01)
*H04N 5/369* (2011.01)

(52) U.S. Cl.
CPC ....... *H04N 5/37457* (2013.01); *H04N 5/3535* (2013.01); *H04N 5/3696* (2013.01); *H04N 5/37455* (2013.01)

(58) Field of Classification Search
CPC ............. H04N 5/37457; H04N 5/3535; H04N 5/3696; H04N 5/37455; H04N 5/365;
(Continued)

(56) References Cited

U.S. PATENT DOCUMENTS

| 6,731,335 B1 | 5/2004 | Kim et al. |
| 2008/0018761 A1* | 1/2008 | Kondo ................... H04N 5/238 348/306 |

(Continued)

OTHER PUBLICATIONS

International Search Report, PCT/US17/14983, 19 pages, dated May 23, 2017.

*Primary Examiner* — Nhan T Tran
(74) *Attorney, Agent, or Firm* — Scott J. Asmus; Calvin B. Ward

(57) ABSTRACT

An imaging array and method for using the same that are adapted for backside illuminated imaging arrays utilizing a global shutter are disclosed. The imaging array includes a plurality of pixel sensors having an ordered array of pixel sensors. Each pixel sensor includes a main photodiode and a correction photodiode. A controller resets all of the main photodiodes at a first time that is the same for all of the pixel sensors, resets all of the correction photodiodes at a second time that is the same for all of the pixel sensors after the first time, and sequentially reads out the pixel sensors. The pixel sensor is read out at a third time that is different for different ones of the pixel sensors. A correction charge is measured that corrects for the different readout times.

10 Claims, 6 Drawing Sheets

(58) Field of Classification Search
CPC ........... H04N 5/35563; H04N 5/37452; H04N 5/353; H04N 5/35554
See application file for complete search history.

(56) References Cited

U.S. PATENT DOCUMENTS

| | | | |
|---|---|---|---|
| 2008/0030605 A1* | 2/2008 | Tsukimura | H04N 3/155 348/302 |
| 2008/0036892 A1* | 2/2008 | Gomi | H04N 5/3454 348/308 |
| 2008/0088726 A1* | 4/2008 | Tsukimura | H04N 5/374 348/308 |
| 2009/0108176 A1 | 4/2009 | Blanquart | |
| 2011/0298949 A1* | 12/2011 | Lee | H04N 5/361 348/231.99 |
| 2015/0008307 A1* | 1/2015 | Fowler | H04N 5/2253 250/208.1 |
| 2015/0373291 A1* | 12/2015 | Oh | H04N 5/3575 348/324 |

* cited by examiner

BACKSIDE ILLUMINATED GLOBAL SHUTTER IMAGING ARRAY

BACKGROUND OF THE INVENTION

The circuitry for CMOS imaging sensors is constructed on one side of a silicon wafer, referred to as the front side in the following discussion. The sensor includes an array of pixel sensors in which each pixel sensor has a photodiode and associated readout circuitry. The photodiode and the active readout circuitry are constructed on the front side of the wafer. Various metal layers are then deposited and patterned over the front side. The metal layers provide the various conductors and some passive components such as capacitors and resistors. In front side illuminated imaging sensors, the image to be captured is imaged onto the pixel sensors from above the front side. Hence, the metal layers must be organized such that the area over each photodiode is not obstructed. As a result, circuitry that could be constructed in the metal layers must be constructed to the side of the array of pixel sensors, which increases the area of silicon needed for an imaging array.

Imaging sensors in which the image is projected onto the pixel sensors from the other side of the silicon wafer have the potential for reducing the size of the imaging array, since the area over the photodiodes on the front side is now available for the construction of circuit elements and the routing of the various signals used to control and read out the pixel sensors. However, backside illuminated pixel sensor arrays present other challenges, particularly when used in global shutter systems in which charge is stored on a floating diffusion node in each pixel sensor while waiting to be read out. The floating diffusion node can be viewed as having a parasitic photodiode which will generate photoelectrons during the storage period if illuminated. In front side illumination schemes, the floating diffusion node is shielded by a mask that is implemented in the metal layers. However, in backside illumination schemes, there is a significant distance between the backside on which such a shield can be deposited and the floating diffusion node. As a result, it is difficult to shield the floating diffusion node without also partially shielding the photodiode in the pixel sensor.

SUMMARY OF THE INVENTION

The present invention includes an imaging array and a method for using the same. The imaging array includes a plurality of pixel sensors having an ordered array of pixel sensors, each pixel sensor being characterized by a position in the ordered array of pixel sensors. Each pixel sensor includes a main photodiode and a correction photodiode. The imaging array also includes a controller that resets all of the main photodiodes at a first time that is the same for all of the pixel sensors, resets all of the correction photodiodes at a second time that is the same for all of the pixel sensors after the first time, and sequentially reads out the pixel sensors. Each of the plurality of pixel sensors is read out at a third time that is different for different ones of the pixel sensors and depends on the location of the pixel sensor in the ordered array of pixel sensors. The readout of each of the plurality of pixel sensors includes measuring a correction charge that accumulated on the correction photodiode in that pixel sensor between the third time and the second time, measuring a total charge that accumulated on the main photodiode in that pixel sensor at the third time, and computing a pixel sensor exposure value representing the charge that had accumulated on the main photodiode at the second time.

In one aspect of the invention, the correction photodiode is characterized by a first light conversion efficiency and the main photodiode is characterized by a second light conversion efficiency, the first light conversion efficiency being less than the second light conversion efficiency. In one exemplary embodiment, the main photodiode is characterized by a first area of silicon that converts light to photoelectrons and the correction photodiode is characterized by a second area of silicon that converts light to photoelectrons, the first area of silicon being greater than the second area of silicon.

In another aspect of the invention, each pixel sensor includes a floating diffusion node, a first transfer gate that connects the main photodiode to the floating diffusion node in response to a first transfer signal, and a second transfer gate that connects the correction photodiode to the floating diffusion node.

In another aspect of the invention, the imaging array includes a bit line and each pixel sensor includes an amplifier that amplifies a voltage on the floating diffusion node to produce a signal on an amplifier output, a bit line gate that connects the amplifier output to the bit line in response to a row select signal and a reset gate that connects the floating diffusion node to a first reset voltage source in response to a reset signal.

In another aspect of the invention, the main photodiode and the correction photodiode are connected in parallel with respect to the floating diffusion node by the first transfer gate and the second transfer gate, respectively.

In another aspect of the invention, the main photodiode and the correction photodiode are connected in series with respect to the floating diffusion node, the main photodiode is connected to the correction photodiode by the first transfer gate and the correction photodiode is connected to floating diffusion node by the second transfer gate.

In another aspect of the invention, the controller measures the total charge by resetting the floating diffusion node and measuring a first voltage on the floating diffusion node after resetting the floating diffusion node; measuring a second voltage on the floating diffusion node after connecting the correction photodiode to the floating diffusion node at the third time, and measuring a third voltage on the floating diffusion node after the main photodiode is connected to the floating diffusion node.

The present invention also includes a method for operating an imaging system having an ordered array of pixel sensors, each pixel sensor being characterized by a position in the ordered array of pixel sensors, and including a main photodiode that receives light during an image exposure. In the method, a controller resets all of the main photodiodes at a first time, defines a second time that marks the end of the image exposure, sequentially measures a total charge that accumulated on the main photodiode in that pixel sensor at a third time that depends on the location of the pixel sensor in the ordered array of pixel sensors, the third time being different for different ones of the plurality of pixel sensors, and corrects the total charge for charge that accumulated on the main photodiode in a time period between the second and third times to obtain an estimate of a global shutter charge that accumulated on the main photodiode at the second time.

In one aspect of the invention, each pixel sensor includes a correction photodiode, and the method includes resetting the correction photodiode at the second time, measuring a correction charge on the correction photodiode at the third time, and correcting the total charge based on the correction charge to obtain the global shutter charge.

In one aspect of the invention, each pixel sensor further includes a floating diffusion node, and obtaining an estimate of the global shutter charge for one of the plurality of pixel sensors which includes resetting the floating diffusion node of that one of the pixel sensors at the third time and measuring a first voltage on the floating diffusion node of that one of the plurality of pixel sensors, connecting the correction photodiode of that one of the plurality of pixel sensors to the floating diffusion node of that one of the plurality of pixel sensors and measuring a second voltage on the floating diffusion node of that one of the plurality of pixel sensors, connecting the main photodiode of that one of the plurality of pixel sensors to the floating diffusion node of that one of the plurality of pixel sensors; and measuring a third voltage on the floating diffusion node of that one of the plurality of pixel sensors, and determining the estimate of the global shutter charge of that one of the plurality of pixel sensors from the first, second, and third voltages.

DETAILED DESCRIPTION

Figure 1:
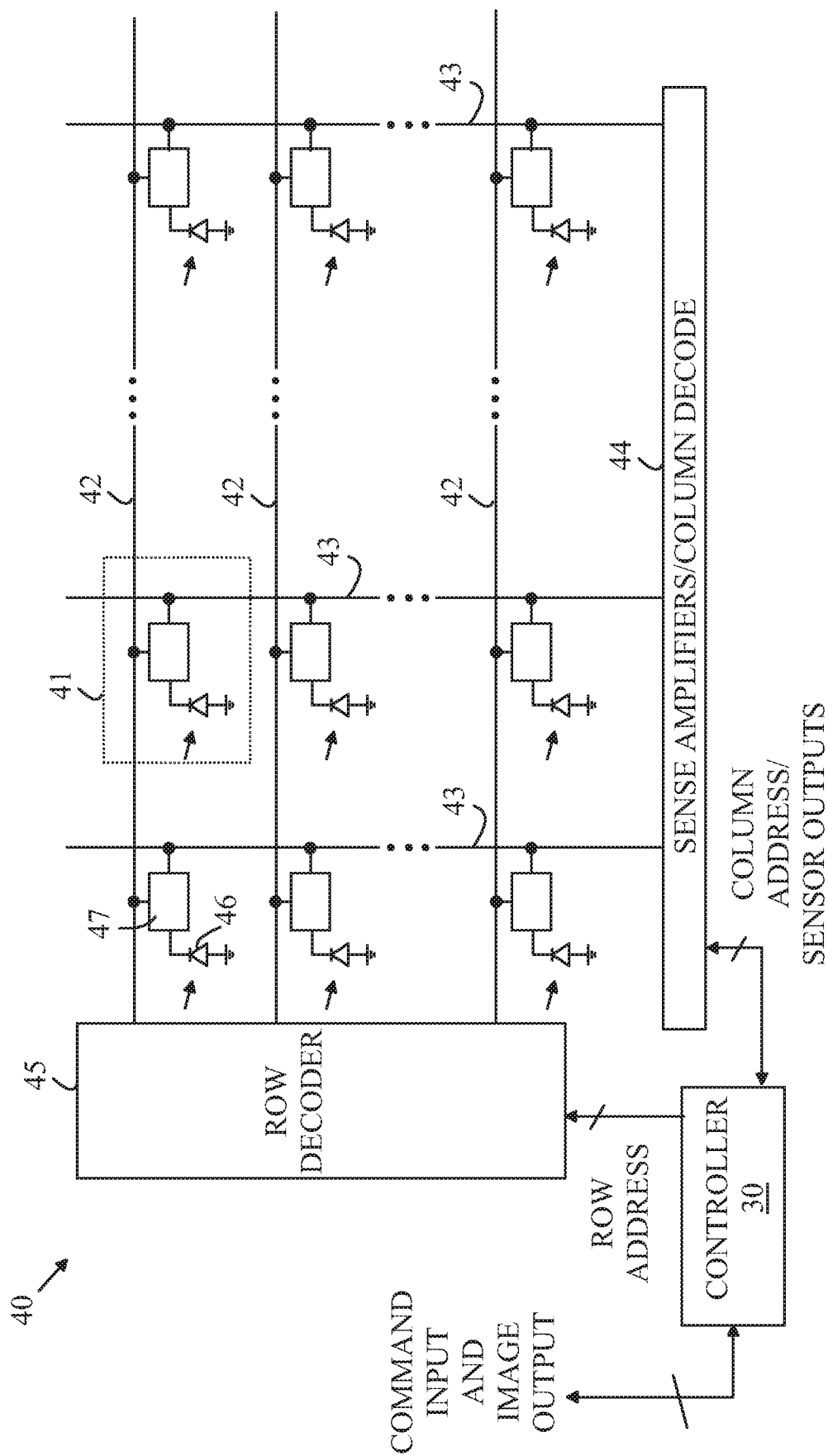
FIG. 1 is a schematic drawing of a CMOS imaging array that utilizes a pixel sensor according to one embodiment of the present invention.

Refer now to FIG. 1, which is a schematic drawing of a CMOS imaging array that utilizes a pixel sensor according to one embodiment of the present invention. Imaging array 40 is constructed from a rectangular array of pixel sensors 41. Each pixel sensor includes a photodiode 46 and an interface circuit 47. The details of the interface circuit depend on the particular pixel design. However, all of the pixel sensors include a gate that is connected to a row line 42 that is used to connect that pixel sensor to a bit line 43. The specific row that is enabled at any time is determined by a row address that is input to a row decoder 45. The row select lines are a parallel array of conductors that run horizontally in the metal layers over the substrate in which the photodiodes and interface circuitry are constructed.

Each of the bit lines terminates in a column processing circuit 44 that typically includes sense amplifiers and column decoders. The bit lines are a parallel array of conductors that run vertically in the metal layers over the substrate in which the photodiode and interface circuitry are constructed. Each sense amplifier reads the signal produced by the pixel that is currently connected to the bit line processed by that sense amplifier. The sense amplifiers may generate a digital output signal by utilizing an analog-to-digital converter (ADC). At any given time, a single pixel sensor is read out from the imaging array. The specific column that is read out is determined by a column address that is utilized by a column decoder to connect the sense amplifier/ADC output from that column to circuitry that is external to the imaging array. The sequencing of the control signals and other functions are performed by a controller 30. To simplify the drawings, the connections between controller 30 and the various control lines have been omitted from the drawing.

Figure 2:
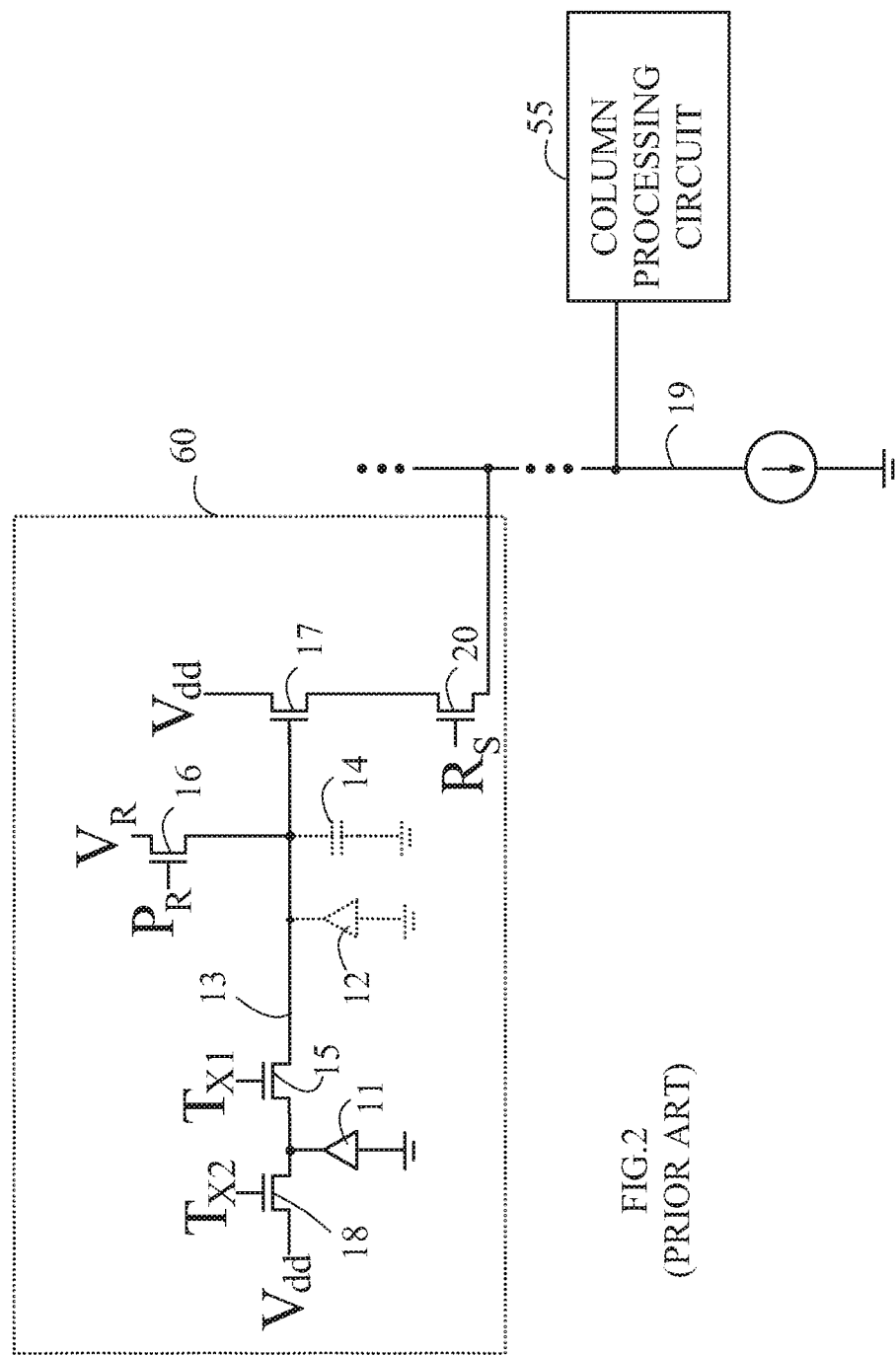
FIG. 2 illustrates a prior art pixel sensor that could be used in the imaging array shown in FIG. 1.

The manner in which the present invention achieves its advantages can be more easily understood with reference to FIG. 2, which illustrates a prior art pixel sensor that could be used in the imaging array shown in FIG. 1. Pixel 60 includes a photodiode 11 that collects the photocharge during an exposure. A transfer gate 15 allows the accumulated charge to be transferred from photodiode 11 to floating diffusion node 13 in response to signal Tx1. For the purposes of the present discussion, a floating diffusion node is defined to be an electrical node that is not tied to a power rail, or driven by another circuit. Floating diffusion node 13 is characterized by a parasitic capacitor 14 having a capacitance, CFD, and a parasitic photodiode 12. In practice, the photocharge accumulated on photodiode 11 is measured by first resetting floating diffusion node 13 to a reset voltage determined by VR by placing a reset gate 16 in a conducting state. Reset gate 16 is then placed in a non-conducting state and the difference in voltage on floating diffusion node 13 that occurs when transfer gate 15 is placed in a conducting state is observed. An optional overflow gate 18 transfers any charge generated after photodiode 11 saturates to the power supply rail to prevent that excess charge from altering the measurements in adjacent pixel sensors.

The voltage on floating diffusion node 13 is amplified by a source follower transistor 17. When pixel 60 is to be readout, a signal on gate transistor 20 connects the output of source follower transistor 17 to a bit line 19 that is shared by all of the pixel sensors in a given column. For the purposes of the present discussion, a bit line is defined to be a conductor that is shared by a plurality of columns of pixel sensors and carries a voltage signal indicative of the voltage at the floating diffusion node in a pixel sensor that is connected to the bit line through a transfer gate. Each bit line terminates in a column processing circuit 55 that includes the circuitry to measure the voltage on the bit line.

In a typical global shutter imaging array, an exposure starts when all of the photodiodes in the imaging array are reset by connecting the photodiodes to VR via the reset gates 16 in all of the pixel sensors. The exposure stops when the charge accumulated on each photodiode is transferred to the corresponding floating diffusion node at the same time. Prior to this transfer, the floating diffusion nodes are reset to a reset voltage and the voltage on each floating diffusion node is measured. The pixel sensors are typically read out one row at a time. Hence, while the photocharge is transferred at the same time, the charge is stored on the floating diffusion nodes prior to being measured for an amount of time that depends on the row in which the pixel sensor is located.

If stray light is present, the parasitic photodiode in each pixel sensor will generate photoelectrons that alter the amount of charge that resides on the floating diffusion node during the storage period. This integrated dark current alters the measured charge and leads to artifacts in the measured image. In front side imaging arrays, a shield overlies each floating diffusion node to reduce these artifacts. As noted above, providing an effective shield in a backside illuminated imaging system presents significant challenges due to the thickness of the wafer.

The present invention executes a "global shutter" scheme in which all of the pixel sensors are reset at the same time to start the exposure; however, the pixel sensors are read out in a rolling shutter mode in which the charge from the exposure is transferred to the floating diffusion node at the time of read out, and the rows are read out one at a time. Since the charge is not stored on the floating diffusion node for a significant period of time, the problems associated with integrating the dark current from the parasitic photodiode associated with the floating diffusion node are substantially reduced.

To simplify the following discussion, a photodiode will be defined to have been reset if the photodiode is connected to a circuit that provides a voltage across the photodiode sufficient to remove all of the photoelectrons accumulated by the photodiode in a previous exposure to light. The reset voltage can be generated by connecting the photodiode to a floating diffusion node that has been charged to a sufficiently high voltage or by connecting the photodiode to a power source via a gate in a conducting state.

A floating diffusion node will be defined as being reset if the floating diffusion node is connected to a DC power source by a gate in a conducting state and then disconnected from that DC power source. The voltage on the floating diffusion node after the reset will be referred to as the floating diffusion node reset voltage. The floating diffusion node reset voltage may differ from the DC source by an amount that depends on any gates used to make this connection. In addition, the reset voltage may vary by an amount determined by noise. The variability of the actual reset voltage across the floating diffusion node with respect to the DC source in any particular reset operation is sufficient to require that the floating diffusion node reset voltage be measured when a knowledge of that voltage is required to determine a photocharge accumulated on a photodiode by connecting that photodiode to the floating diffusion node and measuring a decrease in voltage on the floating diffusion node. The floating diffusion node reset voltage is sufficient to reset a photodiode connected to said floating diffusion node after the floating diffusion node has been reset.

Consider an image sensor having a plurality of rows that are readout in sequence starting with a first row. The end of the exposure is defined to have occurred at the time the charge from the photodiode in the first row is transferred to the corresponding floating diffusion node in each of the pixel sensors of that row. The next row will still be accumulating charge on the photodiodes in that row until that row is readout. Hence, the charge that is transferred from the photodiode to the floating diffusion node in that row consists of two charges: the charge accumulated at the end of the exposure and the charge accumulated between the end of the exposure and the time the charge on the photodiode is actually transferred to the corresponding floating diffusion node. In the present invention, the second charge is measured and subtracted from the accumulated charge that was finally transferred to the floating diffusion node. This second charge will be referred to as the correction charge in the following discussion. In the present invention, the correction charge is measured by a second photodiode, referred to as the correction photodiode, in each pixel sensor.

Figure 3:
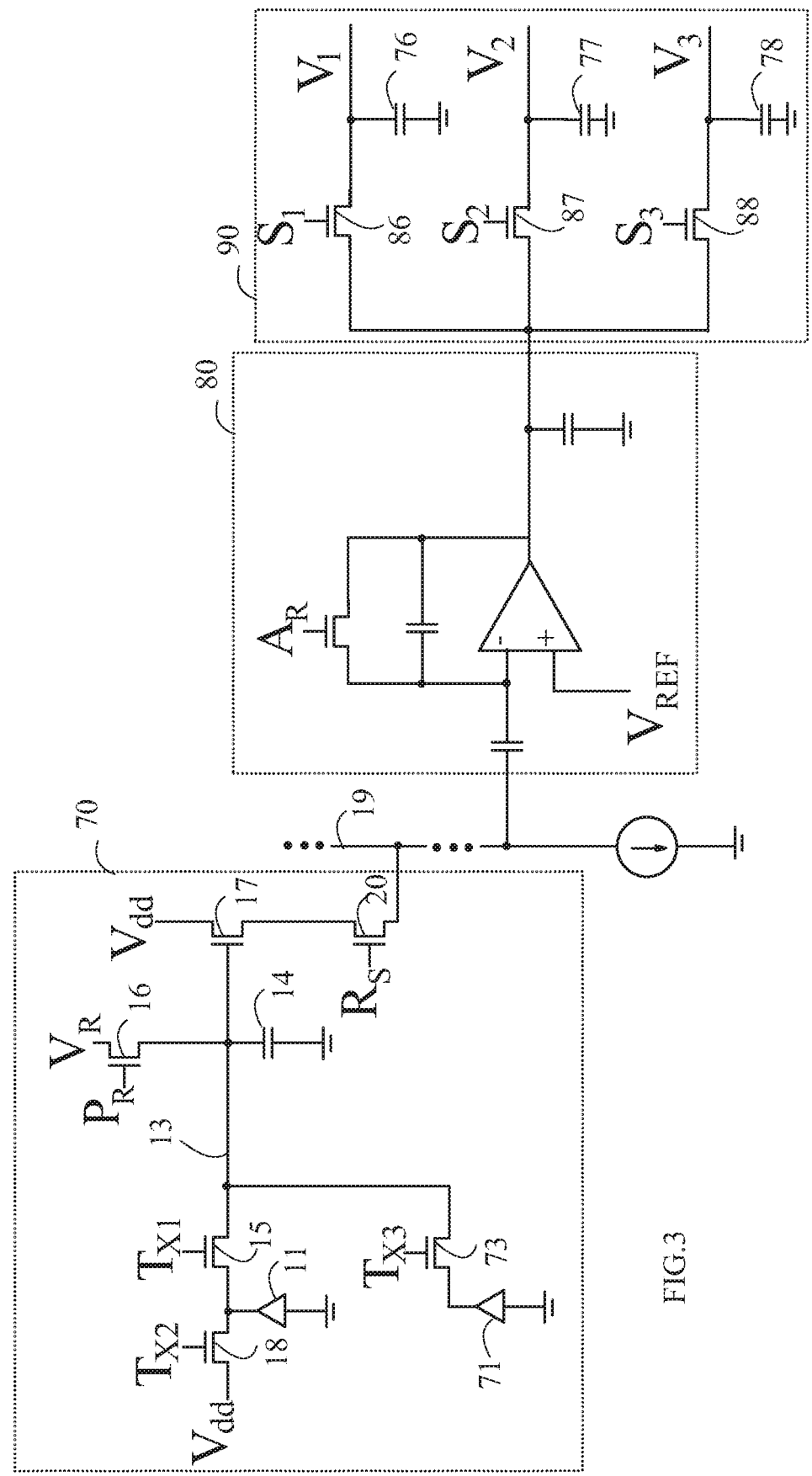
FIG. 3 illustrates one embodiment of a pixel sensor and column processing circuit according to the present invention.

Refer now to FIG. 3, which illustrates one embodiment of a pixel sensor and column processing circuit according to the present invention. To simplify the following discussion, those elements shown in FIG. 3 that serve analogous functions to elements shown in FIG. 2 have been given the same numeric designations and will not be discussed further unless the context requires otherwise. To simplify the drawing, the parasitic photodiode associated with floating diffusion node 13 has been omitted. Pixel sensor 70 includes a main photodiode 11 whose output provides the total accumulated photocharge for that pixel during an exposure. Pixel sensor 70 also includes a correction photodiode 71 that measures the charge accumulated by photodiode 11 after an exposure has ended but before photodiode 11 is actually readout. The photodiodes in pixel sensor 70 will be referred to as being connected in parallel with respect to floating diffusion node 13 in the following discussion.

Figure 4:
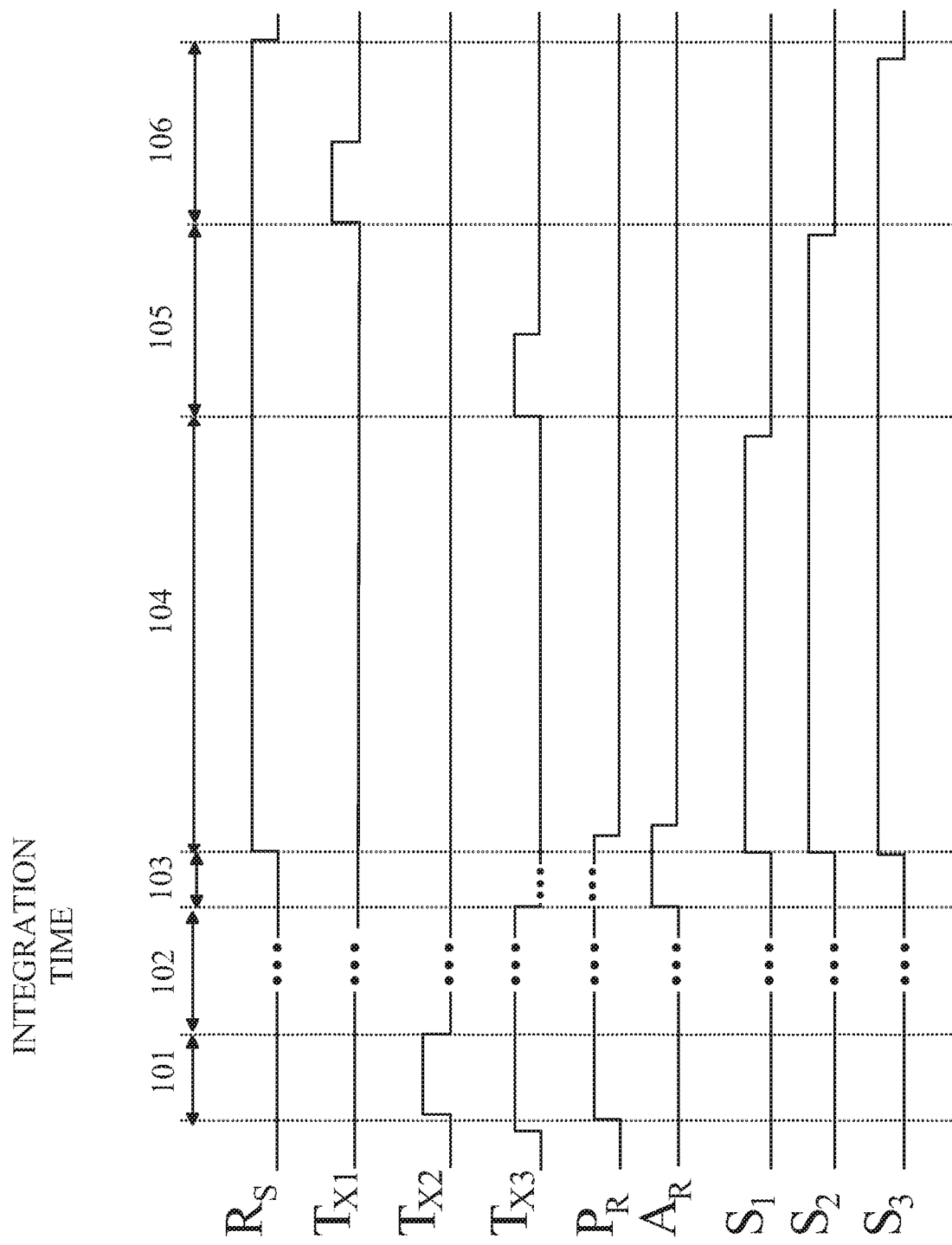
FIG. 4 illustrates the timings on the various control lines of interest during an exposure and readout for one row of an imaging array according to one exemplary embodiment of the present invention.

Refer now to FIG. 4, which illustrates the timings on the various control lines of interest during an exposure and readout for one row of an imaging array according to one exemplary embodiment of the present invention. The time of an exposure and readout can be viewed as having six phases. During the first phase shown at 101, all of the photodiodes are held in a reset condition by connecting the photodiodes either to $V_{dd}$ or $V_R$ by placing gates 16, 73, and 18 in conducting states. At a time determined by the desired exposure time, the exposure period begins as shown at 102. During exposure period 102, main photodiode 11 is isolated by placing gate 18 in a non-conducting state. It should be noted that gate 18 remains at a constant voltage that will determine the voltage at which any overflow charge from main photodiode 11 will be transferred to the $V_{dd}$ power rail. In this exemplary embodiment, correction photodiode 71 remains connected to $V_R$ by maintaining gates 16 and 73 in the conducting state, and hence, is held in a reset state. At the end of exposure period 102, correction photodiode 71 is isolated by placing gate 73 in a non-conducting state. Hence, correction photodiode 71 will begin accumulating photocharge, which provides a measure of the amount of photocharge accumulated by main photodiode 11 after the end of the exposure period.

There is a variable time period between the end of the exposure and the time any given row of pixel sensors is read out. This time period depends on the location of the row of pixel sensors in the readout sequence. The variable time period is shown at 103. Time period 103 will be referred to as the post exposure time period in the following discussion. To more clearly distinguish the post exposure time period from time period 102, time period 102 will be referred to as image exposure time period in the following discussion.

At the end of post exposure time period 103, the readout process for the row of pixels in which pixel sensor 70 is located begins. The pixel in question is connected to bit line 19 by placing gate transistor 20 in a conducting state. The readout process is divided into three time periods shown at 104, 105, and 106. During each time period, a voltage on bit line 19 is amplified by amplifier 80 and stored on a corresponding capacitor in sample and hold memory 90. Amplifier 80 is a capacitive transimpedance amplifier in this exemplary embodiment. However, other forms of amplifiers could be utilized.

The output of amplifier 80 is stored on one of the capacitors by controlling the conductivity of a corresponding gate. The gates corresponding to capacitors 76-78 are shown at 86-88, respectively. Capacitor 76 stores a voltage V1 representing the voltage of floating diffusion node 13 after floating diffusion node 13 has been reset. Capacitor 77 stores a voltage V2 representing the voltage on floating diffusion node 13 after the charge from correction photodiode 71 is transferred to floating diffusion node 13. Finally, capacitor 78 stores a voltage V3 representing the voltage on floating diffusion node 13 after both the charges from correction photodiode 71 and main photodiode 11 have been transferred to floating diffusion node 13. At the end of the readout period, the pixel is disconnected from bit line 19 by placing gate transistor 20 in a non-conducting state.

In one aspect of the invention, correction photodiode 71 is significantly smaller than main photodiode 11. The goal of the backside illumination is to reduce the area of the imaging array. Hence, using a large correction photodiode is contrary to this goal. In one aspect of the invention, the correction photodiode has an area that is a fraction of that of the main photodiode. If the total photodiode area is held constant to produce an imaging array of the same area as a conventional front side global shutter array, then the resulting array will have a smaller dynamic range and higher read noise. However, it is found that the increased noise is within an acceptable range for many applications.

In one exemplary embodiment, given the voltages, V1-V3, the controller generates a voltage that would be observed at the end of the image exposure time if a conventional global shutter were used in which the charge from photodiode 11 were transferred to the floating diffusion node and no contamination of that charge resulted from the parasitic photodiode discussed above. It can be shown, that this voltage, $Vgs=V3-V1-K*(V2-V1)$, where K is a constant that depends on the relative efficiencies of the two photodiodes to convert light to charge and amplification factors of the source follower and bit-line amplifier.

Figure 5:
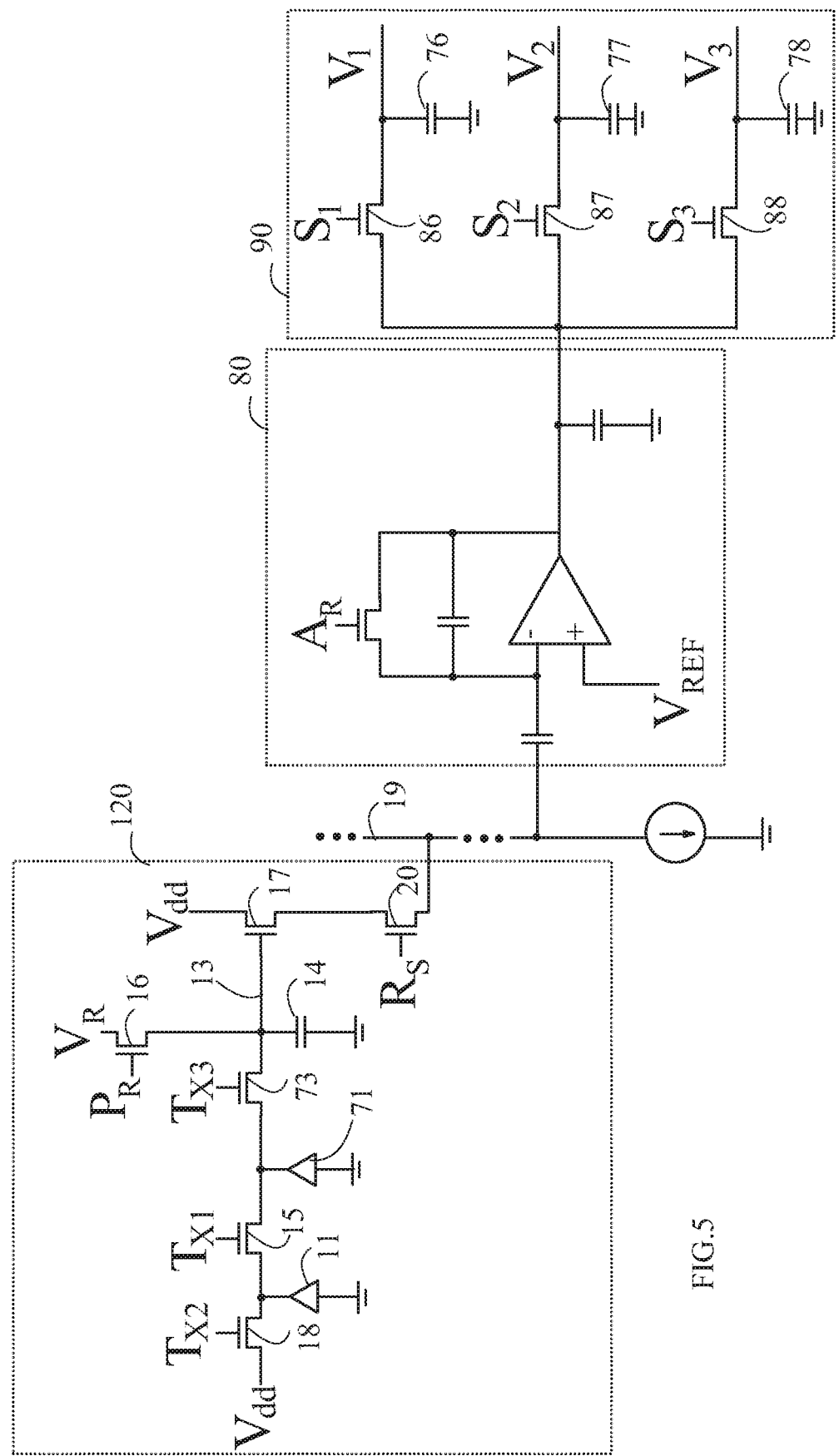
FIG. 5 illustrates a pixel sensor according to another embodiment of the present invention.

The arrangement shown in FIG. 3 results in an increased capacitance for the floating diffusion node because of the parasitic capacitances associated with gate 73. It is advantageous to keep the capacitance of the floating diffusion node as low as possible, as this capacitance determines the conversion gain of the charge to voltage conversion. This parasitic capacitance contribution can be reduced by placing the correction photodiode in series with main photodiode 11. Refer now to FIG. 5, which illustrates a pixel sensor according to another embodiment of the present invention. The arrangement of the photodiodes in pixel sensor 120 will be referred to as a series connection with respect to floating diffusion node 13. To simplify the following discussion, those elements shown in FIG. 5 that serve analogous functions to elements shown in FIG. 3 have been given the same numeric designations and will not be discussed further unless the context requires otherwise. To simplify the drawing, the parasitic photodiode associated with floating diffusion node 13 has once again been omitted. Pixel sensor 120 differs from pixel sensor 70 shown in FIG. 3 in that correction photodiode 71 has been placed in series with main photodiode 11.

Figure 6:
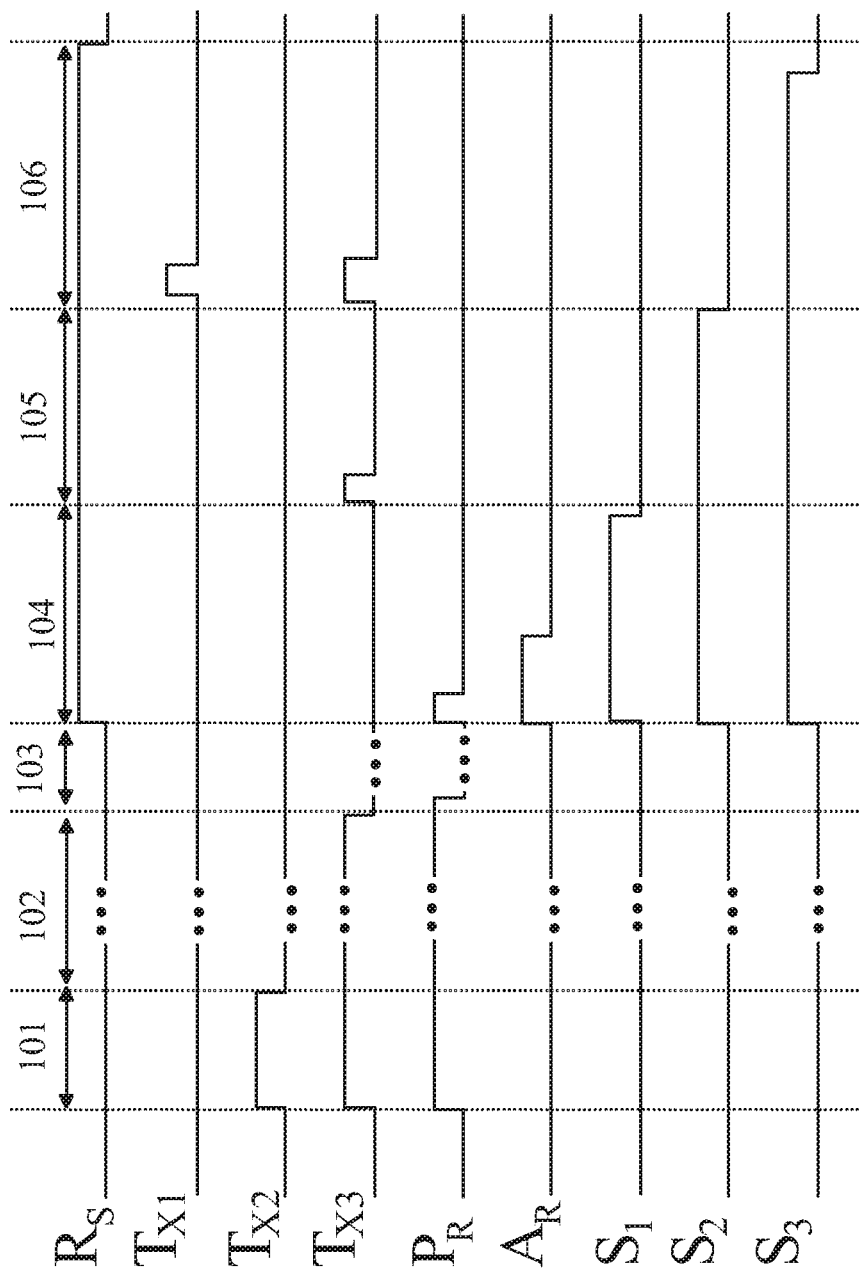
FIG. 6 illustrates the control signal timings for the embodiment shown in FIG. 5.

Refer now to FIG. 6, which illustrates the control signal timings for the embodiment shown in FIG. 5. The readout timing for the circuit shown in FIG. 6 is similar to that for the circuit shown in FIG. 4. The only difference is that both $T_{x1}$ and $T_{x3}$ go high when charge is transferred from big photodiode 11 to floating diffusion node 13.

The above-described embodiments of the present invention have been provided to illustrate various aspects of the invention. However, it is to be understood that different aspects of the present invention that are shown in different specific embodiments can be combined to provide other embodiments of the present invention. In addition, various modifications to the present invention will become apparent from the foregoing description and accompanying drawings. Accordingly, the present invention is to be limited solely by the scope of the following claims.

What is claimed is:

1. An apparatus comprising a plurality of pixel sensors comprising an ordered array of pixel sensors, each pixel sensor being characterized by a position in said ordered array of pixel sensors and comprising:
   a main photodiode; and
   a correction photodiode;
   said apparatus further comprising a controller that
   resets all of said main photodiodes at a first time that is the same for all of said plurality of pixel sensors;
   resets all of said correction photodiodes at a second time that is the same for all of said pixel sensors after said first time; and
   sequentially reads out said pixel sensors, each of said plurality of pixel sensors being read out at a third time that is different for different ones of said pixel sensors and depends on said position of said pixel sensor in said ordered array of pixel sensors, said read out of each of said plurality of pixel sensors comprising:
   measuring a correction charge that accumulated on said correction photodiode in said pixel sensor between said third time and said second time;
   measuring a total charge that accumulated on said main photodiode in said pixel sensor at said third time; and
   computing a pixel sensor exposure value representing a charge that had accumulated on said main photodiode at said second time.

2. The apparatus of claim 1 wherein said correction photodiode is characterized by a first light conversion efficiency and said main photodiode is characterized by a second light conversion efficiency, said first light conversion efficiency being less than said second light conversion efficiency.

3. The apparatus of claim 2 wherein said main photodiode is characterized by a first area of silicon that converts light to photoelectrons and said correction photodiode is characterized by a second area of silicon that converts light to photoelectrons, said first area of silicon being greater than said second area of silicon.

4. The apparatus of claim 1 wherein each pixel sensor comprises:
   a floating diffusion node;
   a first transfer gate that connects said main photodiode to said floating diffusion node in response to a first transfer signal; and
   a second transfer gate that connects said correction photodiode to said floating diffusion node.

5. The apparatus of claim 4 further comprising a bit line, each pixel sensor comprises:
   an amplifier that amplifies a voltage on said floating diffusion node to produce a signal on an amplifier output;
   a bit line gate that connects said amplifier output to said bit line in response to a row select signal; and
   a reset gate that connects said floating diffusion node to a first reset voltage source in response to a reset signal.

6. The apparatus of claim 4 wherein said main photodiode and said correction photodiode are connected in parallel with respect to said floating diffusion node by said first transfer gate and said second transfer gate, respectively.

7. The apparatus of claim 4 wherein said main photodiode and said correction photodiode are connected in series with respect to said floating diffusion node, said main photodiode being connected to said correction photodiode by said first transfer gate and said correction photodiode connected to floating diffusion node by said second transfer gate.

8. The apparatus of claim 4 wherein said controller measures said total charge by resetting said floating diffusion node and measuring a first voltage on said floating diffusion node after resetting said floating diffusion node; measuring a second voltage on said floating diffusion node after connecting said correction photodiode to said floating diffusion node at said third time, and measuring a third voltage on said floating diffusion node after said main photodiode is connected to said floating diffusion node.

9. A method for operating an imaging system comprising an ordered array of pixel sensors, each pixel sensor being characterized by a position in said ordered array of pixel sensors, each pixel sensor comprising a main photodiode that receives light during an image exposure and a correction photodiode, said method comprising:
  resetting all of said main photodiodes at a first time;
  defining a second time that marks an end of said image exposure;
  sequentially measuring a total charge that accumulated on said main photodiode in that pixel sensor at a third time that depends on said position of said pixel sensor in said ordered array of pixel sensors, said third time being different for different ones of said plurality of pixel sensors;
  correcting said total charge for charge that accumulated on said main photodiode in a time period between said second and third times to obtain an estimate of a global shutter charge that accumulated on said main photodiode at said second time;
  resetting said correction photodiode at said second time;
  measuring a correction charge on said correction photodiode at said third time; and
  correcting said total charge based on said correction charge to obtain said global shutter charge.

10. The method of claim 9 wherein each pixel sensor further comprises a floating diffusion node and wherein obtaining an estimate of said global shutter charge for one of said plurality of pixel sensors comprises:
  resetting said floating diffusion node of that one of said pixel sensors at said third time and measuring a first voltage on said floating diffusion node of that one of said plurality of pixel sensors;
  connecting said correction photodiode of that one of said plurality of pixel sensors to said floating diffusion node of that one of said plurality of pixel sensors and measuring a second voltage on said floating diffusion node of that one of said plurality of pixel sensors;
  connecting said main photodiode of that one of said plurality of pixel sensors to said floating diffusion node of that one of said plurality of pixel sensors; and measuring a third voltage on said floating diffusion node of that one of said plurality of pixel sensors; and
  determining said estimate of said global shutter charge of that one of said plurality of pixel sensors from said first, second, and third voltages.

* * * * *